US008629232B2

(12) United States Patent (10) Patent No.: US 8,629,232 B2
Grant et al. (45) Date of Patent: Jan. 14, 2014

(54) POLYMERIC MATERIALS

(75) Inventors: Simon Jonathon Grant, Hest Bank (GB); John Russell Grasmeder, Sandbach (GB); Michael John Percy, Preston (GB); Brian Wilson, Garstang (GB)

(73) Assignee: Victrex Manufacturing Limited, Lancashire (GB)

( * ) Notice: Subject to any disclaimer, the term of this patent is extended or adjusted under 35 U.S.C. 154(b) by 709 days.

(21) Appl. No.: 12/304,860

(22) PCT Filed: Jun. 13, 2007

(86) PCT No.: PCT/GB2007/002201
§ 371 (c)(1),
(2), (4) Date: Feb. 4, 2009

(87) PCT Pub. No.: WO2007/144615
PCT Pub. Date: Dec. 21, 2007

(65) Prior Publication Data
US 2009/0137767 A1 May 28, 2009

(30) Foreign Application Priority Data
Jun. 14, 2006 (GB) .................................. 0611760.0

(51) Int. Cl.
*C08G 8/02* (2006.01)
*C08G 8/28* (2006.01)
(52) U.S. Cl.
USPC ............................ 528/125; 528/220; 528/397
(58) Field of Classification Search
USPC ........................................ 528/125, 220, 397
See application file for complete search history.

(56) References Cited

U.S. PATENT DOCUMENTS

| 4,239,884 | A | 12/1980 | Dahl |
| 4,320,224 | A | 3/1982 | Rose et al. |
| 4,654,263 | A | 3/1987 | Cox |
| 5,777,172 | A | 7/1998 | Standen et al. |
| 6,881,816 | B2 | 4/2005 | Gharda et al. |
| 2009/0131582 | A1 | 5/2009 | Grant et al. |

FOREIGN PATENT DOCUMENTS

| EP | 0102158 | 3/1984 |
| EP | 0152161 | 8/1985 |
| EP | 0178185 | 4/1986 |
| EP | 0315441 | 5/1989 |
| EP | 0414124 | 2/1991 |
| EP | 1454891 | 9/2004 |
| EP | 1464622 | 10/2004 |
| GB | 2200125 | 7/1988 |
| GB | 2355464 | 4/2001 |
| GB | 2412915 | 10/2005 |
| GB | 2427865 | 1/2007 |

(Continued)

OTHER PUBLICATIONS

Kelsey, Donald, R., et al., "Defect-Free" Crystalline Aromatic Poly(ether ketones): A Synthetic Strategy Based on Aceta Monomers, Macromolecules, vol. 20, No. 6, pp. 1204-1212, 1987.

(Continued)

*Primary Examiner* — Duc Truong
(74) *Attorney, Agent, or Firm* — Michael Best & Friedrich LLP

(57) ABSTRACT

A polymeric material includes phenyl moieties, ketone moieties and ether moieties in the polymeric backbone of said polymeric material, wherein the difference between the nucleation temperature (Tn) and the glass transition temperature (Tg) of said polymeric material is greater than 23° C.

23 Claims, 2 Drawing Sheets

(56) References Cited

FOREIGN PATENT DOCUMENTS

Figure 1:
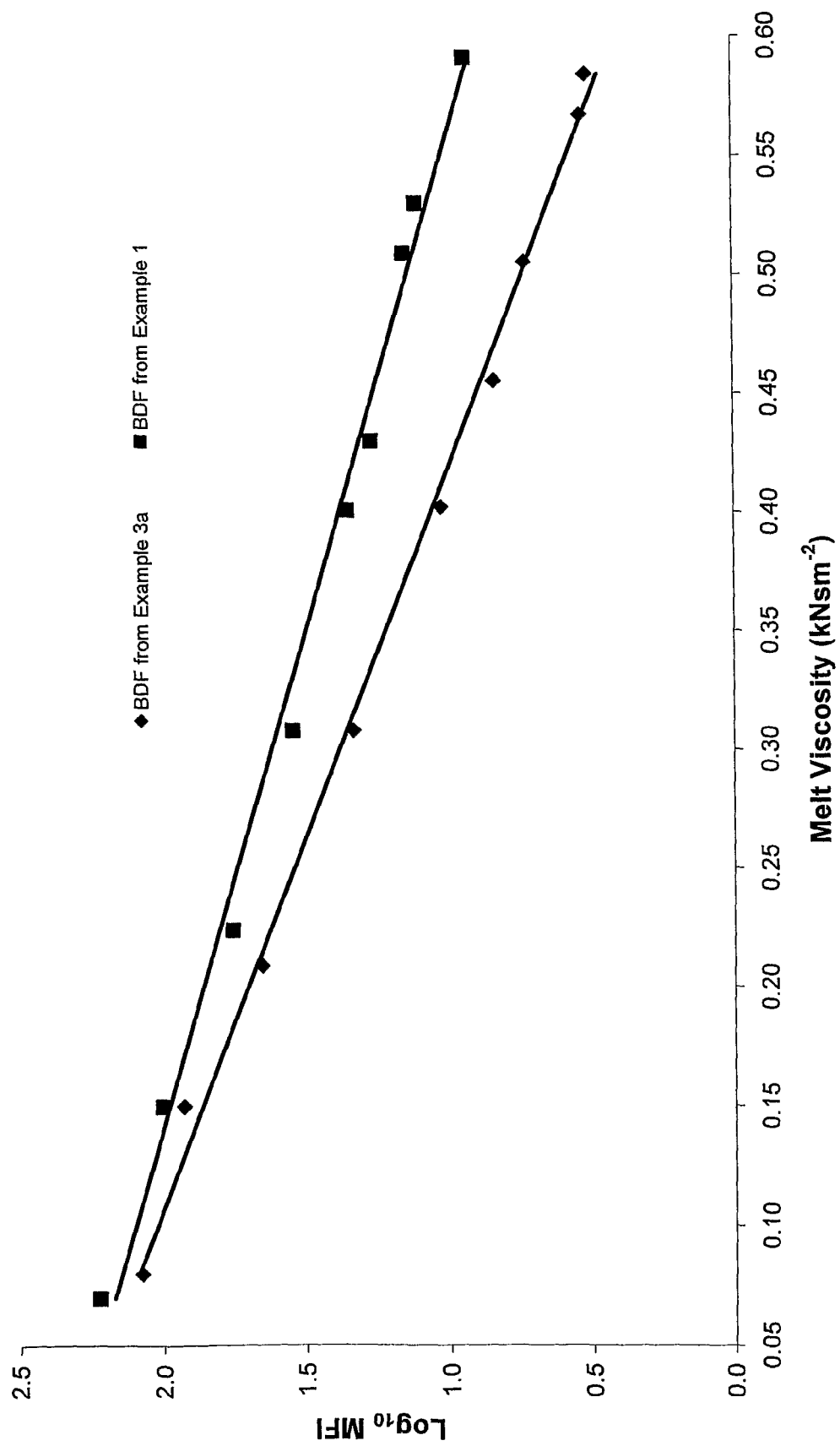

| | | |
|---|---|---|
| JP | 52037993 | 3/1977 |
| JP | 59047233 | 3/1984 |
| JP | 60163926 | 8/1985 |
| JP | 1161018 | 6/1989 |
| JP | 10110043 | 4/1998 |
| JP | 2009540094 | 11/2009 |
| WO | 2005030836 | 4/2005 |

OTHER PUBLICATIONS

PCT/GB2007/002194 International Search Report dated Oct. 5, 2007 (4 pages).

GB0711445.7 United Kingdom Search Report dated Oct. 12, 2007 (1 page).

PCT/GB2007/002201 Search Report dated Oct. 1, 2007.

GB0711442.4 Search Report dated Oct. 11, 2007.

POLYMERIC MATERIALS

This invention relates to polymeric materials and particularly, although not exclusively, relates to polymeric materials per se, processes for their preparation and uses of such materials. Preferred embodiments relate to polyaryletherketones, for example polyetheretherketone.

Polyetheretherketone is a high performance thermoplastic polymer which is used in situations where superior chemical and physical properties are required.

To draw and thermoform a semi-crystalline polymer, such as polyetheretherketone, which is in an amorphous state, requires that the polymer should be reasonably easy to stretch. The polymer must therefore be in a rubbery state with the draw or thermoforming temperature above Tg (glass transition temperature, the transition from the glass to the rubber state), but to prevent excessive crystallisation during the drawing or thermoforming stage, the temperature must be below Tn (cold crystallisation or nucleation temperature; the temperature above which crystalline order increases). Therefore it is beneficial to have the difference between Tg and Tn to be as large as possible. This gives the widest possible processing window in thermoforming shaped articles before crystallisation occurs or in orientation processes such as mono-axially drawn or bi-axially drawn films or tubes (both sequentially drawn and simultaneously drawn).

The difference between the Tg and Tn (the polymer being analysed in the amorphous state) for polyetheretherketone such as that sold by Victrex Plc as grade 450G is about 22° C. which is too narrow a processing window for use in some drawing and/or thermoforming processes. Attempts to overcome this problem include providing polyaryletherketone copolymers which include a comonomer selected to disrupt the crystallinity of the polyaryletherketone and therefore increase the Tn, and expand the processing window. However, disadvantageously, such copolymers tend to have inferior chemical and/or physical properties compared to polyaryletherketone, for example polyetheretherketone homopolymer.

It is an object of the present invention to address the above-described problem.

According to a first aspect of the invention, there is provided a process for the preparation of a polymeric material which includes phenyl moieties, ketone moieties and ether moieties in the polymeric backbone of said polymeric material, said process comprising selecting at least one monomer having a moiety of formula

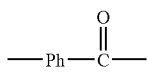

I wherein Ph represents a phenyl moiety and wherein said at least one monomer has a purity of at least 99.7 area %.

Surprisingly, it has been found that by providing a relatively pure monomer of formula I, the difference between Tg and Tn of the polymer is increased which may allow the polymer to be more readily used in drawing and/or thermoforming processes. Furthermore, surprisingly, it has been found that by providing a relatively pure monomer of formula I, the Melt Flow Index (MFI) of said polymeric material prepared is significantly greater than expected. This may also facilitate drawing and/or thermo forming processes.

The purity of said at least one monomer may be assessed using Gas Chromotographic (GC) analysis, suitably using the method described in Test 3 hereinafter.

Said at least one monomer may have a purity of at least 99.75 area % suitably at least 99.8 area %, preferably at least 99.85 area %, more preferably at least 99.88 area %, especially at least 99.9 area %.

Said at least one monomer preferably includes at least two phenyl moieties which are suitably unsubstituted. Said at least two phenyl moieties are preferably spaced apart by another atom or group. Said other atom or group may be selected from —O— and —CO—. Said at least one monomer as described may comprise phenoxyphenoxybenzoic acid or a benzophenone.

Said at least one monomer preferably includes a terminal group selected from a halogen atom (for example a chlorine or fluorine atom, with the latter being especially preferred), an —OH moiety and a —COOH moiety. Said at least one monomer preferably includes a terminal group selected from a fluorine atom and a —COOH group.

Said process may comprise:

(a) polycondensing a compound of general formula

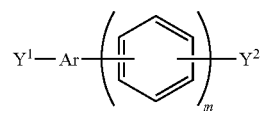

V with itself wherein $Y^1$ represents a halogen atom or a group -EH and $Y^2$ represents a halogen atom or a group —COOH or EH, provided that $Y^1$ and $Y^2$ do not together represent hydrogen atoms;

(b) polycondensing a compound of general formula

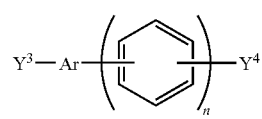

VI with a compound of formula

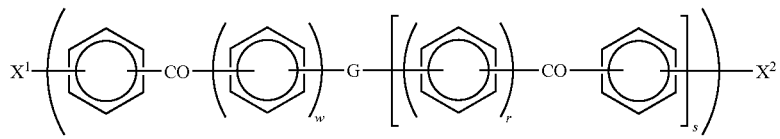

VII and/or with a compound of formula

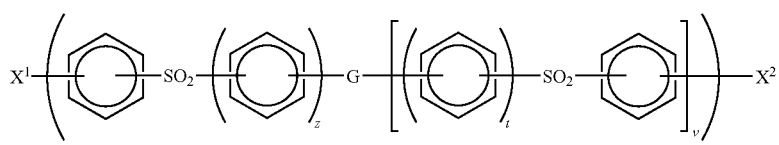

wherein $Y^3$ represents a halogen atom or a group -EH and $X^1$ represents the other one of a halogen atom or group -EH and $Y^4$ represents a halogen atom or a group -EH and $X^2$ represents the other one of a halogen atom or a group -EH;

(c) optionally copolymerizing a product of a process as described in paragraph (a) with a product of a process as described in paragraph (b);

wherein each Ar is independently selected from one of the following moieties (i) to (iv) which is bonded by one or more of its phenyl moieties (preferably in its 4,4'-positions) to adjacent moieties

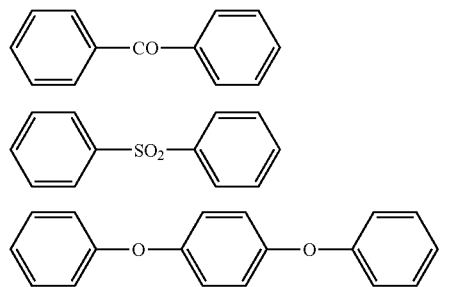

wherein each m, n, w, r, s, z, t and v is independently zero or a positive integer;

wherein each G is independently selected from an oxygen or sulphur atom, a direct link or a —O-Ph-O— moiety where Ph represents a phenyl moiety; and wherein each E is independently selected from an oxygen or sulphur atom or a direct link.

Unless otherwise stated in this specification, a phenyl moiety preferably has 1,4'- or 1,3'-, especially 1,4', linkages to moieties to which it is bonded.

Unless otherwise stated a phenyl moiety is preferably unsubstituted.

Preferred Ar moieties include moieties (i), (iii) and (iv).

Each m, n, w, r, s, z, t and v is preferably independently zero or 1.

The process may be used to produce a polymeric material as described below.

Said polymeric material may be a homopolymer having a repeat unit of general formula

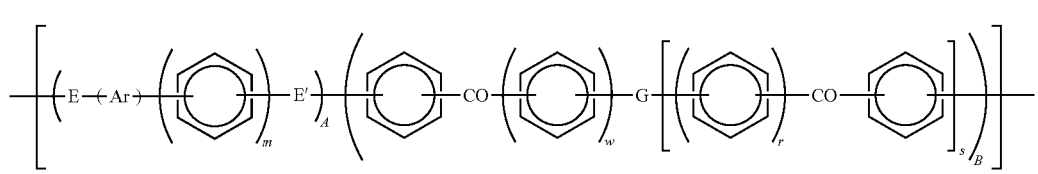

or a random or block copolymer of at least two different units of IV, wherein A and B independently represent 0 or 1 and E, G, Ar, m, r, s and w are as described in any statement herein and E' may be independently selected from any moiety described for E.

As an alternative to a polymeric material comprising unit(s) IV discussed above, said polymeric material may be a homopolymer having a repeat unit of general formula

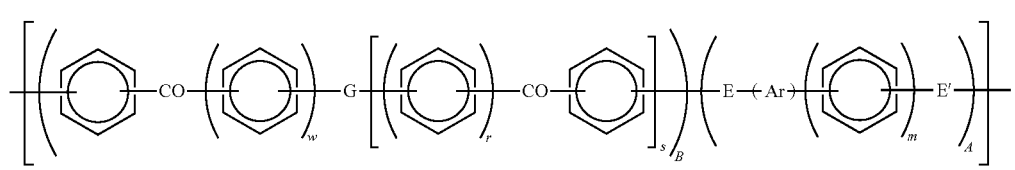

or a random or block copolymer of at least two different units of IV* wherein A and B, independently represent 0 or 1 and E, E', G, Ar, m, r, s and w are as described in any statement herein.

Preferably, m is in the range 0-3, more preferably 0-2, especially 0-1. Preferably, r is in the range 0-3, more preferably 0-2, especially 0-1. Preferably, s is 0 or 1. Preferably, w is 0 or 1.

Preferably, said polymeric material is a homopolymer having a repeat unit of general formula IV.

Said polymeric material preferably comprises (e.g. at least 80 wt %, preferably at least 90 wt %, especially at least 95 wt % of said polymeric material comprises), more preferably consists essentially of, a repeat unit of formula

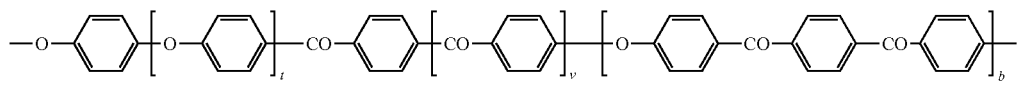

where t, v and b independently represent 0 or 1. Preferred polymeric materials have a said repeat unit wherein either t=1 or v=0 with in each case b=0; t=0, v=0 and b=0; t=0, v=1 and b=0; t=1, v=1, b=0; and t=0, v=0, b=1. More preferred have t=1 and v=0; or t=0 and v=0. The most preferred has t=1 and v=0.

In preferred embodiments, said polymeric material is selected from polyetheretherketone, polyetherketone and polyetherketoneketone. In a more preferred embodiment, said polymeric material is selected from polyetherketone and polyetheretherketone, polyetheretherketoneketone and polyetherketonetherketoneketone. In an especially preferred embodiment, said polymeric material is polyetheretherketone.

The process described in (a) may be an electrophilic or a nucleophilic process.

In a first embodiment of the process described in (a) wherein $Y^1$ represents a hydrogen atom and $Y^2$ represents a group —COOH, the process may be electrophilic. The process is preferably carried out in the presence of a condensing agent which may be a methane sulphonic acid, for example methane sulphonic anhydride. A solvent is suitably present and this may be a methane sulphonic acid. In said first embodiment, preferably in said compound of formula V, $Y^1$ represents a hydrogen atom, $Y^2$ represents a group —COOH, Ar represents a moiety of formula (iii) and m represents 0. Said process may be as described in EP1263836 and EP1170318.

In a second embodiment of the process described in (a) preferably one of $Y^1$ and $Y^2$ represents a fluorine atom and the other represents an hydroxyl group. Such a monomer may be polycondensed in a nucleophilic process. Examples of monomers include 4-fluoro-4'-hydroxybenzophenone, 4-hydroxy-4'-(4-fluorobenzoyl)benzophenone; 4-hydroxy-4'-(4-fluorobenzoyl)biphenyl; and 4-hydroxy-4'-(4-fluorobenzoyl)diphenylether.

The process described in (b) is preferably nucleophilic Preferably, $Y^3$ and $Y^4$ each represent an hydroxy group. Preferably, $X^1$ and $X^2$ each represent a halogen atom, suitably the same halogen atom.

Where the process described in paragraph (b) is carried out, suitably, "a*" represents the mole % of compound VI used in the process; "b*" represents the mole % of compound VII used in the process; and "c*" represents the mole % of compound VIII used in the process.

Preferably, a* is in the range 45-55, especially in the range 48-52. Preferably, the sum of b* and c* is in the range 45-55, especially in the range 48-52. Preferably, the sum of a*, b* and c* is 100.

Preferably c* is 0. The polycondensation preferably comprises polycondensation of one monomer of formula VI and one monomer of formula VII and the sum of a* and b* is about 100.

The ratio of the number of moles of compounds(s) of formula VI to compound(s) of formula VII contacted in the method is preferably in the range 1 to 1.5, especially in the range 1 to 1.1. Preferably, only one compound of formula VI is used in the method.

Where the process described in paragraph (b) is carried out, preferably, one of either the total mole % of halogen atoms or groups -EH in compounds VI, VII and VIII is greater, for example by up to 10%, especially up to 5%, than the total mole % of the other one of either the total mole % of halogen atoms or groups -EH in compounds VI, VII and VIII. Where the mole % of halogen atoms is greater, the polymer may have halogen end groups and be more stable than when the mole % of groups -EH is greater in which case the polymer will have -EH end groups.

The molecular weight of the polymer can also be controlled by using an excess of halogen or hydroxy reactants. The excess may typically be in the range 0.1 to 5.0 mole %. The polymerisation reaction may be terminated by addition of one or more monofunctional reactants as end-cappers.

A preferred process described in (b) comprises polycondensing a compound of general formula VII wherein $X^1$ and $X^2$ represent fluorine atoms, w represents 1, G represents a direct link and s represents 0, with a compound of general formula VI wherein $Y^3$ and $Y^4$ represent —OH groups, Ar represents moiety (iv) and m represents 0 or with a compound of formula VI wherein $Y^3$ and $Y^4$ represent —OH groups, Ar represents moiety (i) and m represents 0. Another preferred process described in (b) comprises polycondensing a compound of general formula VII wherein $X^1$ and $X^2$ represent fluorine atoms, w represents 0, G represents a direct link, r represents 1 and s represents 1 with a compound of formula VI wherein $Y^3$ and $Y^4$ represents —OH groups, Ar represents a moiety (i) and m represents 0.

The monomer with said purity as described is preferably of general formula VII. $X^1$ and $X^2$ in said compound preferably represent fluorine atoms. Said monomer is preferably of formula VII wherein $X^1$ and $X^2$ represent fluorine atoms, w represents 1, G represents a direct link and s represents 0.

Said process of the first aspect is preferably carried out in the presence of a solvent. The solvent may be of formula

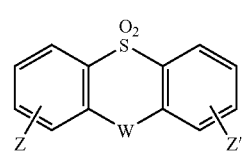

where W is a direct link, an oxygen atom or two hydrogen atoms (one attached to each benzene ring) and Z and Z', which may be the same or different, are hydrogen atoms or phenyl groups. Examples of such aromatic sulphones include diphenylsulphone, dibenzothiophen dioxide, phenoxathiin dioxide and 4-phenylsulphonyl biphenyl. Diphenylsulphone is a preferred solvent.

The polymeric material prepared preferably consists essentially of moieties derived from the specified monomers (V), (VI), (VII) and (VIII).

A said polymer prepared preferably consists essentially of moieties derived from a monomer of formula V; or from a monomer of formula VI polycondensed with a monomer of formula VII. Preferably, said polymer does not include any moiety derived from a monomer of formula VIII.

In said compounds of formulae V, VI, VII and VIII each phenyl moiety is preferably 1,4-substituted.

The process described in paragraph (c) is preferably not used.

Preferred processes of the first aspect may be selected from:
(d) polycondensation of the following phenoxy phenoxy benzoic acid with itself

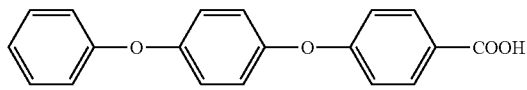 [SMILES: O=C(O)c1ccc(Oc2ccc(Oc3ccccc3)cc2)cc1]

suitably to prepare a polymer which comprises, preferably consists essentially of, a polymer of formula X as herein defined, wherein p represents 1; and (e) polycondensation of 4,4'-difluorobenzophenone with either hydroquinone or 4,4'-dihydroxybenzophenone.

Preferably, substantially the entirety of the repeat units are derived from the monomers referred to in (d) and (e).

In a preferred embodiment, the process comprises a polycondensation referred to in paragraph (e), suitably to prepare a polymer which comprises, preferably consists essentially of, a repeat unit of formula

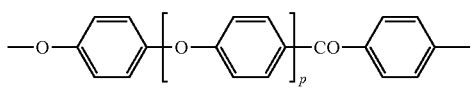

wherein p represents 0 or 1. In an especially preferred embodiment, p represents 1.

The MV of said polymeric material may be at least 0.06 kNsm$^{-2}$, more preferably is at least 0.08 kNsm$^{-2}$ and, especially, is at least 0.085 kNsm$^{-2}$. The MV may be less than 4.0 kNsm$^{-2}$, is suitably less than 2.0 kNsm$^{-2}$, is preferably less than 1.0 kNsm$^{-2}$, is more preferably less than 0.75 kNsm$^{-2}$ and, especially, is less than 0.5 kNsm$^{-2}$.

Suitably the MV is in the range 0.08 kNsm$^{-2}$ to 1.0 kNsm$^{-2}$, preferably in the range 0.085 kNsm$^{-2}$ to 0.5 kNsm$^{-2}$.

Unless otherwise stated, Melt Viscosity/MV described herein is suitably measured using capillary rheometry operating at 400° C. at a shear rate of 1000 s$^{-1}$ using a tungsten carbide die, 0.5×3.175 mm, as described in the Test 1 hereinafter.

Said polymeric material may have a tensile strength, measured in accordance with ASTM D638 of at least 100 MPa.

The tensile strength is preferably greater than 105 MPa. It may be in the range 100-120 MPa, more preferably in the range 105-110 MPa.

Said polymeric material may have a flexural strength, measured in accordance with ASTM D790 of at least 145 MPa, preferably at least 150 MPa, more preferably at least 155 MPa. The flexural strength is preferably in the range 145-180 MPa, more preferably in the range 150-170 MPa, especially in the range 155-160 MPa.

Said polymeric material may have a flexural modulus, measured in accordance with ASTM D790, of at least 3.5 GPa, preferably at least 4 GPa. The flexural modulus is preferably in the range 3.5-4.5 GPa, more preferably in the range 3.8-4.4 GPa.

The glass transition temperature ($T_g$) of said polymeric material may be at least 140° C., suitably at least 143° C. In a preferred embodiment, the glass transition temperature is in the range 140° C. to 145° C.

The main peak of the melting endotherm (Tm) for said polymeric material (if crystalline) may be at least 300° C.

Said polymeric material is preferably semi-crystalline. The level and extent of crystallinity in a polymer is preferably measured by wide angle X-ray diffraction (also referred to as Wide Angle X-ray Scattering or WAXS), for example as described by Blundell and Osborn (Polymer 24, 953, 1983). Alternatively, crystallinity may be assessed by Differential Scanning Calorimetry (DSC).

The level of crystallinity in said polymeric material may be at least 1%, suitably at least 3%, preferably at least 5% and more preferably at least 10%. In especially preferred embodiments, the crystallinity may be greater than 30%, more preferably greater than 40%, especially greater than 45%.

Compounds of general formula V, VI, VII and VIII are commercially available (eg from Aldrich U.K.) and/or may be prepared by standard techniques, generally involving Friedel-Crafts reactions, followed by appropriate derivatisation of functional groups.

According to a second aspect of the invention, there is provided a polymeric material prepared in a process according to the first aspect.

According to a third aspect of the invention, there is provided a polymeric material of a type described according to the first aspect, for example being a homopolymer or copolymer of a repeat unit of general formula IV or IV*, wherein the difference between the Tn and Tg of said polymeric material is greater than 23° C.

The Tg and Tn are suitably measured as described in Example 8 hereinafter.

The difference between the Tn and Tg may be at least 24° C., preferably at least 25° C., more preferably at least 26° C., especially at least 26.5° C. The difference may be less than 35° C.

The Tg of the material is preferably at least 130° C., more preferably at least 140° C.

The ratio of the Tn to Tg of said polymeric material is suitably greater than 1.16, preferably greater than 1.17, more preferably greater than 1.18.

Said polymeric material may have a melt viscosity (MV) (measured as described herein) in the range 0.08 to 0.50 kNsm$^{-2}$, suitably in the range 0.085 to 0.46 kNsm$^{-2}$. Said MV may be in the range 0.14 to 0.5 kNsm$^{-2}$, suitably in the range 0.3 to 0.5 kNsm$^{-2}$, preferably in the range 0.35 to 0.5 kNsm$^{-2}$, especially in the range 0.4 to 0.5 kNsm$^{-2}$.

Said polymeric material may have having a repeat unit of formula

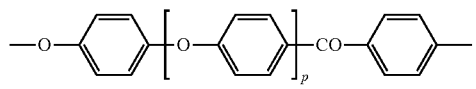

where Ph represent a phenyl moiety, p represents 0 or 1, said polymeric material having a melt viscosity (MV) measured in kNsm$^{-2}$ and a Melt Flow Index (MFI), wherein:

(a) when p represents 1, the actual $\log_{10}$ MFI of said polymeric material is greater than the Expected Value for the $\log_{10}$ MFI calculated using the formula:

Expected Value (EV)=−3.2218x+2.3327 wherein x represents the MV in kNsm$^{-2}$ of said polymeric material; or (b) when p represents 0, the actual $\log_{10}$ MFI of said polymeric material is greater than the Expected Value for the $\log_{10}$ MFI calculated using the formula:

Expected Value (EV)=−2.539y+2.4299 wherein y represents the MV in kNsm$^{-2}$ of said polymeric material.

MV is suitably measured using capillary rheometry operating at 400° C. at a shear rate of 1000 s$^{-1}$ using a tungsten carbide die, 0.5×3.175 mm, as described in the Test hereinafter.

MFI is a measure of the ease of flow of the melt of a thermoplastic polymer. It may be measured as described in Test 2 hereinafter.

Said polymeric material may comprise at least 80 wt %, preferably at least 90 wt %, especially at least 95 wt % of said repeat unit X.

Said polymeric material preferably consists essentially of a repeat unit of formula X where p=1 or where p=0—that is, the polymeric material is preferably polyetheretherketone or polyetherketone.

When p represents 1, the actual $\log_{10}$ MFI of said polymeric material may be greater than the Expected Value for the $\log_{10}$ MFI calculated using the formula:

Expected Value (EV)=$m_1$x+2.33 where x represents the MV in kNsm$^{-2}$ of said polymeric material and $m_1$ is greater than −3.00. Suitably, $m_1$ is greater than −2.8, preferably greater than −2.6, more preferably greater than −2.5, especially greater than −2.45. In a preferred embodiment, when p represents 1, the Expected Value is approximately given by the equation:

Expected Value (EV)=−2.4x+2.34 wherein x represents the MV in kNsm$^{-2}$ of said polymeric material.

When p represents 0, the actual $\log_{10}$ MFI of said polymeric material may be greater than the Expected Value for the $\log_{10}$ MFI calculated using the formula:

Expected Value (EV)=$m_2$y+2.43 where y represents the MV in kNsm$^{-2}$ of said polymeric material and $m_2$ is greater than −2.5. Suitably, $m_2$ is greater than −2.45, preferably greater than −2.40, more preferably greater than −2.35.

Said polymeric material is preferably of formula X wherein p represents 1, the difference between Tn and Tg is at least 25° C., the Tg of the material is at least 140° C. and is less than 145° C.

According to a fourth aspect of the invention, there is provided a method of producing a component or an article, the method comprising drawing and/or thermoforming a polymeric material according to the second or third aspects in order to define said component or article.

The drawing and/or thermoforming is preferably carried out at a temperature of less than the Tn of the polymeric material, preferably at less than 171° C.

The component or article may comprise a shaped part (e.g. having a hollow region), a fibre, tube or film.

According to a fifth aspect of the invention, there is provided a thermoformed or drawn component or article, said component or article comprising a polymeric material according to the second or third aspects or being made according to the fourth aspect.

Said component or article may include a hollow region. Said component or article may be a fibre, tube or film.

Any feature of any aspect of any invention or embodiment described herein may be combined with any feature of any aspect of any other invention or embodiment described herein mutatis mutandis.

Figure 2:
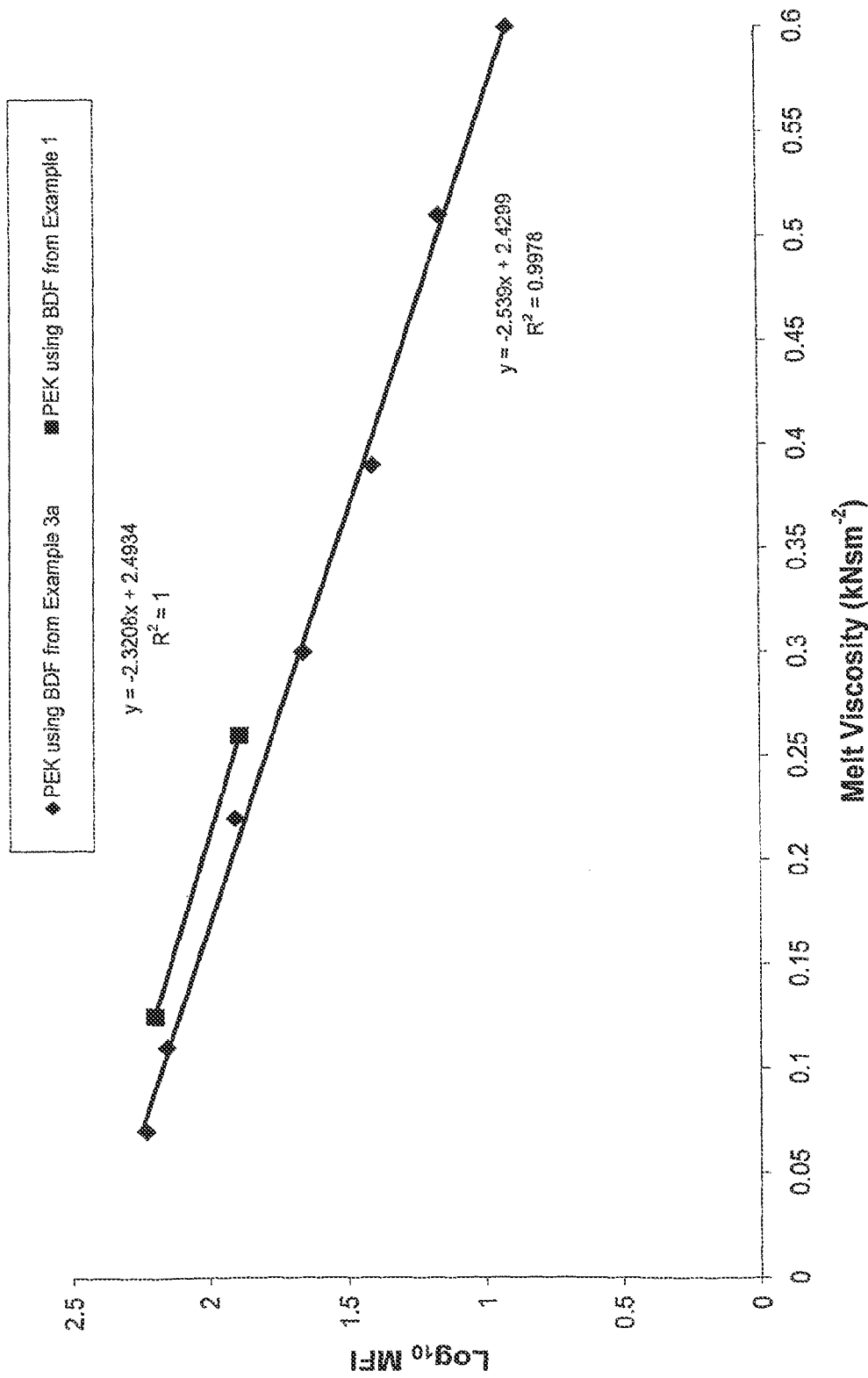

Specific embodiments of the invention will now be described, by way of example, with reference to the accompanying figures in which FIG. 1 is a plot of $\log_{10}$ MFI v. Melt Viscosity for polyetheretherketones made with different 4,4'-difluorobenzophenones; and FIG. 2 is a plot of $\log_{10}$ MFI v. Melt Viscosity for polyetherketone.

Unless otherwise stated, all chemicals referred to hereinafter were used as received from Sigma-Aldrich Chemical Company, Dorset, U.K.

The following tests were used in the examples which follow.

Test 1—Melt Viscosity of Polyaryletherketones

Melt Viscosity of the polyaryletherketone was measured using a ram extruder fitted with a tungsten carbide die, 0.5× 3.175 mm. Approximately 5 grams of the polyaryletherketone was dried in an air circulating oven for 3 hours at 150° C. The extruder was allowed to equilibrate to 400° C. The dried polymer was loaded into the heated barrel of the extruder, a brass tip (12 mm long×9.92±0.01 mm diameter) placed on top of the polymer followed by the piston and the screw was manually turned until the proof ring of the pressure gauge just engages the piston to help remove any trapped air. The column of polymer was allowed to heat and melt over a period of at least 5 minutes. After the preheat stage the screw was set in motion so that the melted polymer was extruded through the die to form a thin fibre at a shear rate of 1000 s$^{-1}$, while recording the pressure (P) required to extrude the polymer. The Melt Viscosity is given by the formula $$\text{Melt Viscosity} = \frac{P\pi r^4}{8LSA} kNsm^{-2}$$

where
P=Pressure/kN m$^{-2}$
L=Length of die/m
S=ram speed/m s$^{-1}$
A=barrel cross-sectional area/m$^2$
r=Die radius/m The relationship between shear rate and the other parameters is given by the equation:

$$\text{Apparent wall shear rate} = 1000 s^{-1} = \frac{4Q}{\pi r^3}$$

where Q=volumetric flow rate/m$^3$ s$^{-1}$=SA

Test 2—Melt Flow Index of Polyaryletherketones

The Melt Flow Index of the polyaryltherketone was measured on a CEAST Melt Flow Tester 6941.000. The dry polymer was placed in the barrel of the Melt Flow Tester apparatus and heated to a temperature specified in the appropriate Examples, this temperature being selected to fully melt the polymer. The polymer was then extruded under a constant shear stress by inserting a weighted piston (5 kg) into the barrel and extruding through a tungsten carbide die, 2.095 mmbore×8.000 mm. The MFI (Melt Flow Index) is the mass of polymer (in g) extruded in 10 minutes.

Test 3—Gas Chromatographic (gc) Analysis of 4,4'-difluorobenzophenone

Gc analysis was performed on a Varian 3900 Gas Chromatograph, using a Varian GC column: CP Sil 8CB non-polar, 30 m, 0.25 mm, 1 μm DF (part no. CP8771) and the running conditions were:
Injector temperature 300° C.
Detector temperature 340° C.
Oven ramp 100° C. to 300° C. at 10° C./min hold 10 minutes (total run time 30 minutes)
Split ratio 50:1
Injection volume 1 μL The sample is made up by dissolving 100 mg of 4,4'-difluorobenzophenone in 1 ml of dichloromethane.

The GC retention time for 4,4'-difluorobenzophenone is around 13.8 minutes.

The purity is quoted as a area %, calculated using a standard method.

Test 4—Melting Point Range Determination

The melting point range is determined automatically by optical transmission measurement using a Büchi B-545. The first value is recorded at 1 percent transmission.

| Settings: | gradient: | 1° C./min |
|---|---|---|
| | Set point: | 101° C. |
| | mode: | pharmacopoe |
| | detection: | 1 and 90 percent |

The melting point range is recorded as the difference between 90 and 1 percent of melting point determination.

EXAMPLE 1

Preparation of 4,4'-difluorobenzophenone (BDF) by Reacting Fluorobenzene and Carbon Tetrachloride (based on the process described by L. V. Johnson, F Smith, M Stacey and J C Tatlow, J Chem. Soc., 4710-4713 (919) 1952)

A 1 l 3-necked round-bottomed flask fitted with a mechanical stirrer, a thermometer, a dropping funnel containing fluorobenzene (192 g, 2 moles) and carbon tetrachloride (290 g), a thermometer and a reflux condenser was charged with carbon tetrachloride (250 g) and anhydrous aluminium trichloride (162 g, 1.2 moles). The fluorobenzene/carbon tetrachloride solution was added dropwise over a period of 1 hour to the aluminium trichloride suspension in carbon tetetrachloride maintained at 10° C. with stirring. The reaction mixture was then maintained at 15° C. for a further 16 hours. The reaction mixture was poured into ice-water, the organic layer was separated, washed with aqueous sodium bicarbonate solution, then with water.

The organic phase was charged to a 2 l 3-necked round-bottomed flask fitted with a mechanical stirrer, a thermometer and a reflux condenser containing a 50:50 mixture of ethanol/water (500 cm³). The mixture was heated to reflux temperature and held for 30 minutes, allowed to cool to room temperature and the crude solid product was recovered by filtration and dried at 70° C. under vacuum.

Dry crude product (100 g) was dissolved with stirring in hot industrial methylated spirits (400 cm³) and charcoal, filtered, water (100 cm³) was added, reheated to reflux dissolve the product and cooled. The product was filtered off, washed with 1:1 industrial methylated spirits/water then dried at 70° C. under vacuum. The product had melting point range of 107-108° C. determined using Test 4 and a purity of 99.9 area % 4,4'-difluorobenzophenone determined using Test 3

EXAMPLE 2

Preparation of 4,4'-difluorobenzophenone (BDF) by reacting fluorobenzene and 4-fluorobenzoylchloride A 10 l 3-necked round-bottomed flask fitted with a mechanical stirrer, a thermometer, a dropping funnel containing 4-fluorobenzoyl chloride (1550 g, 9.78 moles) and a reflux condenser was charged with fluorobenzene (2048 g, 21.33 moles) and anhydrous aluminium trichloride (1460 g, 10.94 moles). The mixture was maintained at 20 to 30° C. with stirring and the 4-fluorobenzoylchloride was added dropwise over a period of 1 hour. When the addition was complete the temperature of the reaction mixture was increased to 80° C. over a period of 2 hours, allowed to cool to ambient temperature then carefully discharged into ice (4 kg)/water (2 kg). The mixture was recharged to a 20 l 1-necked round-bottomed flask fitted with distill head. The contents were heated to distill off the excess fluorobenzene until a still-head temperature of 100° C. was reached. The mixture was cooled to 20° C. and the crude 4,4'-difluorobenzophenone was filtered off, washed with water and dried at 70° C. under vacuum.

The crude product was recrystallised as described in Example 1. The product had a melting point range of 107-108° C. determined using Test 4 and a purity of 99.9 area % 4,4'-difluorobenzophenone determined using Test 3.

EXAMPLE 3

Preparation of 4,4'-difluorobenzophenone (BDF) by the Nitric Acid Oxidation of 4,4'-difluorodiphenylmethane The process described in Example 2, EP 4710 A2 for the oxidation of 4,4'-difluorodiphenylmethane was followed except the scale was increased by a factor of 3.

EXAMPLE 3a

Following the recrystallisation procedure described in Example 2 of EP 4710 A2, 4,4'-difluorobenzophneone (115 g) with a melting point range 106-107° C. and a purity of 99.6%, analysed using Test 3 was produced.

EXAMPLE 3b

The product from Example 3a was recrystallised again using the same procedure giving 4,4'-difluorobenzophenone (95 g) with a melting point range 107-108° C. and a purity of 99.9% as analysed by gc.

EXAMPLE 4a

Preparation of Polyetheretherketone

A 250 ml flanged flask fitted with a ground glass Quickfit lid, stirrer/stirrer guide, nitrogen inlet and outlet was charged with 4,4'-difluorobenzophenone from Example 1 (22.48 g, 0.103 mole), hydroquinone (11.01 g, 0.1 mole) and diphenylsulphone (49 g) and purged with nitrogen for over 1 hour. The contents were then heated to between 140 and 150° C. to form an almost colourless solution. Dried sodium carbonate (10.61 g, 0.1 mole) and potassium carbonate (0.278 g, 0.002 mole) were added. The temperature was raised to 200° C. and held for 1 hour; raised to 250° C. and held for 1 hour; raised to 315° C. and maintained for 2 hours. Details on the Melt Viscosity and Melt Flow Index of the product measured using the Tests described above are given in Table 1 below.

EXAMPLES 4b-4t

Preparation of Samples of Polyetheretherketone from Different Sources of 4,4'-difluorobenzophenone (BDF) and a Range of Melt Viscosities The procedure described in Example 4a was repeated except the source of 4,4'-difluorobenzophenone was changed and the polymerisation time was varied to produce polyetheretherketone with a range of melt viscosities. Details on the Melt Viscosity and Melt Flow Index of the products prepared are given in Table 1 below.

TABLE 1

| Example | 4,4'-diflurobenzophenone source | Reaction Time (mins) | Melt Viscosity (kNsm$^{-2}$) | Melt Flow Index 380° C. (g/10 min) |
|---|---|---|---|---|
| 4a | Example 1 | 115 | 0.07 | 169.3 |
| 4b | Example 1 | 120 | 0.15 | 102.0 |
| 4c | Example 1 | 140 | 0.22 | 57.4 |
| 4d | Example 1 | 165 | 0.31 | 35.3 |
| 4e | Example 1 | 180 | 0.40 | 22.6 |
| 4f | Example 1 | 180 | 0.43 | 18.6 |
| 4g | Example 1 | 190 | 0.51 | 14.2 |
| 4h | Example 1 | 190 | 0.53 | 12.9 |
| 4i | Example 1 | 195 | 0.59 | 8.7 |
| 4j | Example 2 | 160 | 0.42 | 19.4 |
| 4k | Example 3a | 105 | 0.08 | 120.0 |
| 4l | Example 3a | 115 | 0.15 | 85.6 |
| 4m | Example 3a | 145 | 0.21 | 45.3 |
| 4n | Example 3a | 155 | 0.31 | 21.6 |
| 4o | Example 3a | 160 | 0.40 | 10.6 |
| 4p | Example 3a | 175 | 0.46 | 6.9 |
| 4q | Example 3a | 180 | 0.51 | 5.4 |
| 4r | Example 3a | 190 | 0.57 | 3.4 |
| 4s | Example 3a | 190 | 0.58 | 3.2 |
| 4t | Example 3b | 180 | 0.44 | 18.4 |

The Melt Viscosity and MFI data for Examples 4a to 4i and 4k to 4s are presented graphically in FIG. 1 from which it may be calculated $Log_{10}$ MFI (Example 3a based polyetheretherketone)=2.35−3.22*Melt Viscosity (Example 3a based polyetheretherketone); and $Log_{10}$ MFI (Example 1 based polyetheretherketone)=2.34−2.4*Melt Viscosity (Example 1 based polyetheretherketone)

EXAMPLE 5a

Preparation of Polyetherketone

A 250 ml flanged flask fitted with a ground glass Quickfit lid, stirrer/stirrer guide, nitrogen inlet and outlet was charged with 4,4'-difluorobenzophenone from Example 1 (33.49 g, 0.153 mole), 4,4'-dihydroxybenzophenone (32.13 g, 0.150 mole) and diphenylsulphone (124.5 g) and purged with nitrogen for over 1 hour. The contents were then heated to 160° C. to form an almost colourless solution. Dried sodium carbonate (16.59 g, 0.156 mole) was added. The temperature was raised to 340° C. at 1° C./min and held for 2 hours.

The reaction mixture was allowed to cool, milled and washed with acetone and water. The resulting polymer was dried in an air oven at 120° C. producing a powder. The details of the colour, Melt Viscosity and Melt Flow Index of the product are given in Table 2 below.

EXAMPLE 5b-j

Preparation of a Sample of Polyetherketone from a Different Source of 4,4'-difluorobenzophneone The procedure described in Example 5a was repeated except the source of 4,4'-difluorobenzophenone was changed and the polymerisation time was varied to produce polyetheretherketone with a range of melt viscosities. Details are provided in Table 2.

TABLE 2

| Example | 4,4'-difluorobenzophenone source | Reaction Time (mins) | Melt Viscosity (kNsm$^{-2}$) | Melt Flow Index 400° C. (g/10 min) |
|---|---|---|---|---|
| 5a | Example 1 | 120 | 0.125 | 160 |
| 5b | Example 1 | 125 | 0.26 | 67 |
| 5c | Example 3a | 110 | 0.07 | 171 |
| 5d | Example 3a | 120 | 0.11 | 146 |
| 5e | Example 3a | 125 | 0.22 | 81 |
| 5f | Example 3a | 135 | 0.3 | 46 |
| 5g | Example 3a | 145 | 0.39 | 26 |
| 5h | Example 3a | 160 | 0.44 | 20.8 |
| 5i | Example 3a | 165 | 0.51 | 14 |
| 5j | Example 3a | 170 | 0.6 | 18 |

The Melt Viscosity and MFI data for Examples 5a to 5j are represented graphically in FIG. 2 from which it may be calculated:

$Log_{10}$ MFI (Example 3a-based polyketone)=2.42−2.539*Melt Viscosity (Example 3a-based polyketone).

EXAMPLE 6

Polymer Rheology by Fibre Drawing

Approximately 25 grams of the polyetheretherketone from Example 4f was dried in an air circulating oven for 3 hours at 150° C. A Bohlin RH10 capillary rheometer, fitted with a die 1.0 mm diameter×16 mm length and 180 degree entrance angle was allowed to equilibrate to 380° C. The dried polymer was loaded into the heated barrel of the rheometer and manually packed down with a tamping tool. A piston was then placed on the crosshead and driven down onto the top of the polymer. The column of polymer was allowed to heat and melt over a period of at least 6 minutes, with a short packing pressure being applied to the piston to help remove any trapped air. The melted polymer was extruded through the die to form a thin fibre at the defined cross-head speed for the desired shear rate of the test.

The conditions were:
Capillary rheometer settings were:

| | |
|---|---|
| shear rate during test | 90 s-1 |
| haul off start speed | between 20 and 50 m/min (adjusted to suit the samples) |
| haul off end speed | 500 m/min |
| time of test | 5 mins |
| acceleration | about 1.5 m/min/s (or 90 m/min/min or 0.025 m/s/s) |

The fibre was then taken around a free running pulley mounted on a top pan balance and to a controlled speed haul-off unit. The pulley on the balance measured the draw force on the fibre as the draw speed was accelerated during the test. The instrument software recorded both the linear speed of the fibre and the force required to draw the fibre. The speed was increased at a constant acceleration until the fibre was caused to break. The break speed is given in Table 3 below.

The procedure described above was repeated using the polymer from Example 4p and the break speed is given in Table 3 below.

TABLE 3

| Example | Polyetheretherketone from Example | Speed at Break (m/min) |
|---|---|---|
| 6a | 4f | 418 |
| 6b | 4p | 249 |

EXAMPLE 7

Tensile Measurements of Drawn Fibres

Fibres from the polymers in Example 4f and 4p were made by melt extruding and drawing fibres from the Bohlin capillary rheometer at a barrel temperature of 380° C., a shear rate of $250 s^{-1}$ and haul off speed of 80 m/min. The resulting fibres were tested for mechanical properties The fibres were stored for a minimum of 24 hours prior to testing at 23° C. (±2° C.) and 50% r.h. (+5%). The fibres were tested for tensile properties at a test speed of 50 mm/min using an Instron 5565 Universal test frame in conjunction with a 10N load cell and due to the delicate nature of the fibres great care was taken when clamping the specimens and a pair of pneumatic grips were used. The gauge length was 100 mm.

Each fibre was measured across its diameter using a video microscope fitted with a 20× magnification lens.

The results are given in Table 4 below.

TABLE 4

| Fibre from Example | Stress at break (MPa) | Elongation at break (%) | Secant Modulus (GPa) | Stress at Yield (MPa) | Elongation at Yield (%) |
|---|---|---|---|---|---|
| 6a | 133.7 | 140.0 | 1.68 | 38.95 | 5.9 |
| 6b | 157.8 | 114.0 | 2.26 | 51.38 | 6.66 |

EXAMPLE 8

Differential Scanning Calorimetry of Drawn Fibres

The Glass Transition Temperatures (Tg) the Cold Crystallisation Temperature (Tn) and the Melting Temperatures (Tm) and the Crystallisation Temperature from the melt (Tc) of the fibres from Examples 6a and 6b were determined by Differential Scanning Calorimetry (DSC) examining a 10 mg plus or minus 10 microgram powder sample of the fibre in a TA Instruments DSC Q100 under nitrogen at a flow rate of 40 ml/min.

The scan procedure was:
Step 1 Perform and record a preliminary thermal cycle by heating the sample from 30° C. to 450° C. at 20° C./min, recording the Tg, Tn and Tm.
Step 2 Hold for 2 mins
Step 3 Cool at 10° C./min to 30° C. and hold for 5 mins, recording Tc.
Step 4 Heat from 30° C. to 450° C. at 20° C./min, recording the Tg and Tm.

From the resulting curve the onset of the Tg was obtained as the intersection of lines drawn along the pre-transition baseline and a line drawn along the greatest slope obtained during the transition. The Tn was the temperature at which the main peak of the cold crystallisation exotherm reaches a maximum. The Tm was the temperature at which the main peak of the melting endotherm reaches a maximum. The Tc was the temperature at which the main peak of the crystallisation from the melt exotherm reaches a maximum.

The Heat of Fusion (ΔH (J/g)) was obtained by connecting the two points at which the melting endotherm deviates from the relatively straight baseline. The integrated area under the endotherm as a function of time yields the enthalpy (mJ) of the transition, the mass normalised Heat of Fusion is calculated by dividing the enthalpy by the mass of the specimen (J/g). The level of crystallisation (X(%)) is determined by dividing the Heat of Fusion of the specimen by the Heat of Fusion of a totally crystalline polymer, which for polyetheretherketone, for which data is available is 130 J/g".

The results are given in Table 5 below.

TABLE 5

| Fibre from Example | Initial Heat | | | | | Reheat | | |
|---|---|---|---|---|---|---|---|---|
| | Tg (° C.) | Tn (° C.) | Tm (° C.) | ΔH (J/g) | Tc (° C.) | Tm (° C.) | ΔH (J/g) | X (%) |
| 6a | 144 | 171 | 344 | 38 | 288 | 341 | 43 | 33.1 |
| 6b | 144 | 166 | 345 | 39 | 289 | 340 | 45 | 34.6 |

The mechanical properties of drawn fibres from the two sources of BDF are shown in Table 4. The fibres made from the higher purity BDF showed a lower tensile strength and modulus, but with a higher elongation to break under the same extrusion conditions. The stress required to reach the yield point of the fibres was also lower.

The lower tensile strengths would allow for a lower stress and an easier shaping process of parts in a thermoforming process prior to the crystallisation and allow lower drawing forces to be used in the stretching process. The higher elongations obtained may also allow the films, fibre and tubing to be oriented to higher stretch ratios with the purer BDF over the standard purity BDF, allowing thinner gauge oriented films, fibres and tubes to be produced.

The DSC results provided show that fibre drawn from polyetheretherketone prepared from high purity BDF has a wider processing window compared to fibre drawn from low purity BDF.

In addition to advantages resulting from the Tg/Tn relationship described, the relatively high MFI for a given MV may improve flow of the polymeric materials described thereby facilitating their use in drawing and/or thermoforming processed.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A process for the preparation of a polymeric material which comprises a repeat unit of the following formula:

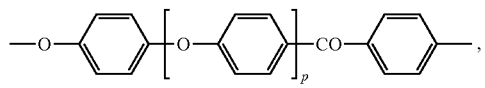

wherein p is 1, and wherein the difference between the nucleation temperature Tn and the glass transition temperature Tg of said polymeric material is greater than 23° C., said process comprising:
selecting a 4,4'-difluorobenzophenone monomer having a purity of at least 99.7 area % as measured using Gas Chromatographic analysis; and
polycondensing said 4,4'-difluorobenzophenone with hydroquinone to produce said polymeric material.

2. The process according to claim 1, wherein said purity is at least 99.85 area % as measured using Gas Chromatographic analysis.

3. The process according to claim 1, wherein said purity is at least 99.9 area % as measured using Gas Chromatographic analysis.

4. The process according to claim 1, wherein said polymeric material consists essentially of said repeat unit.

5. The process according to claim 1, wherein the difference between Tn and Tg is at least 26° C.; and is less than 35° C.

6. The process according to claim 1, wherein the Tg of the polymeric material is at least 140° C.

7. The process according to claim 1, wherein the ratio of the Tn to the Tg of said polymeric material is greater than 1.16.

8. The process according to claim 1, wherein said polymeric material has a melt viscosity (MV) in the range 0.08 to 0.50 kNsm$^{-2}$.

9. The process according to claim 1, wherein said polymeric material has a melt viscosity (MV) measured in kNsm$^{-2}$ and a Melt Flow Index (MFI), wherein the actual $\log_{10}$ MFI of said polymeric material is greater than the Expected Value for the $\log_{10}$ MFI calculated using the formula:

Expected Value(EV)=−3.2218$x$+2.3327 wherein x represents the MV in kNsm$^{-2}$ of said polymeric material.

10. The process according to claim 9, wherein the difference between Tn and Tg is at least 25° C., the Tg of the material is at least 140° C. and is less than 145° C.

11. The process according to claim 1, wherein the actual $\log_{10}$ MFI of said polymeric material is greater than the Expected Value for the $\log_{10}$ MFI calculated using the formula:

Expected Value(EV)=$m_1 x$+2.33 where x represents the MV in kNsm$^{-2}$ of said polymeric material and $m_1$ is greater than −3.00.

12. The process according to claim 11, wherein $m_1$ is greater than −2.45.

13. A process for the preparation of a polymeric material which comprises a repeat unit of the following formula:

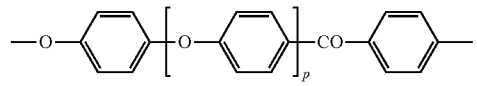

wherein p is 0, and wherein the difference between the nucleation temperature Tn and the glass transition temperature Tg of said polymeric material is greater than 23° C., said process comprising:
selecting a 4,4'-difluorobenzophenone monomer having a purity of at least 99.7 area % as measured using Gas Chromatographic analysis; and
polycondensing said 4,4'-difluorobenzophenone with 4,4'-dihydroxybenzophenone to produce said polymeric material.

14. The process according to claim 13, wherein said purity is at least 99.85 area % as measured using Gas Chromatographic analysis.

15. The process according to claim 13, wherein said purity is at least 99.9 area % as measured using Gas Chromatographic analysis.

16. The process according to claim 13, wherein said polymeric material consists essentially of said repeat unit.

17. The process according to claim 13, wherein the difference between Tn and Tg is at least 26° C.; and is less than 35° C.

18. The process according to claim 13, wherein the Tg of the polymeric material is at least 140° C.

19. The process according to claim 13, wherein the ratio of the Tn to the Tg of said polymeric material is greater than 1.16.

20. The process according to claim 13, wherein said polymeric material has a melt viscosity (MV) in the range 0.08 to 0.50 kNsm$^{-2}$.

21. The process according to claim 13, wherein said polymeric material has a melt viscosity (MV) measured in kNsm$^{-2}$ and a Melt Flow Index (MFI), wherein the actual $\log_{10}$ MFI of said polymeric material is greater than the Expected Value for the $\log_{10}$ MFI calculated using the formula:

Expected Value(EV)=−2.539$y$+2.4299 wherein y represents the MV in kNsm$^{-2}$ of said polymeric material.

22. The process according to claim 13, wherein the actual $\log_{10}$ MFI of said polymeric material is greater than the Expected Value for the $\log_{10}$ MFI calculated using the formula Expected Value(EV)=$m_2 y$+2.43 where y represents the MV in kNsm$^{-2}$ of said polymeric material and $m_2$ is greater than −2.5.

23. The process according to claim 22, wherein $m_2$ is greater than −2.35.

* * * * *

UNITED STATES PATENT AND TRADEMARK OFFICE
CERTIFICATE OF CORRECTION

PATENT NO.        : 8,629,232 B2                                          Page 1 of 1
APPLICATION NO. : 12/304860
DATED             : January 14, 2014
INVENTOR(S)       : Grant et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 884 days.

Signed and Sealed this
Twenty-second Day of September, 2015

Michelle K. Lee
*Director of the United States Patent and Trademark Office*